US008373804B2

(12) United States Patent
Ling et al.

(10) Patent No.: US 8,373,804 B2
(45) Date of Patent: Feb. 12, 2013

(54) TUNER FOR CABLE, SATELLITE AND BROADCAST APPLICATIONS

(75) Inventors: Curtis Ling, Carlsbad, CA (US); Patrick Tierney, San Diego, CA (US); Ramakrishna Akella, San Diego, CA (US)

(73) Assignee: Maxlinear, Inc., Carlsbad, CA (US)

( * ) Notice: Subject to any disclaimer, the term of this patent is extended or adjusted under 35 U.S.C. 154(b) by 968 days.

(21) Appl. No.: 12/184,652

(22) Filed: Aug. 1, 2008

(65) Prior Publication Data

US 2009/0040391 A1 Feb. 12, 2009

Related U.S. Application Data

(60) Provisional application No. 60/953,645, filed on Aug. 2, 2007.

(51) Int. Cl.
*H04N 5/455* (2006.01)
*H04N 5/50* (2006.01)

(52) U.S. Cl. .......................................... 348/731; 348/726

(58) Field of Classification Search ............... 455/178.1, 455/179.1, 293, 309, 311, 312; 348/726, 348/725, 678, 731; 375/345, 350
See application file for complete search history.

(56) References Cited

U.S. PATENT DOCUMENTS

| 5,375,146 | A * | 12/1994 | Chalmers | 375/350 |
| 7,450,185 | B2 * | 11/2008 | Wu | 348/725 |
| 7,577,414 | B2 * | 8/2009 | Mehr | 455/234.1 |
| 7,599,673 | B2 * | 10/2009 | Maxim et al. | 455/179.1 |
| 7,643,600 | B2 * | 1/2010 | Maxim et al. | 375/371 |
| 2004/0038649 | A1 | 2/2004 | Lin et al. | |
| 2006/0122814 | A1 | 6/2006 | Beens et al. | |
| 2006/0245519 | A1 | 11/2006 | Cheng et al. | |
| 2008/0039047 | A1 * | 2/2008 | Kubota | 455/343.1 |

FOREIGN PATENT DOCUMENTS

| CN | 101855834 A | 10/2010 |
| JP | 2010519257 A | 6/2010 |
| KR | 20100031779 A | 3/2010 |
| WO | WO 2009035790 A1 | 3/2009 |

OTHER PUBLICATIONS

Office Action for Japanese Patent Application No. 2010-519257, mailed on Jan. 11, 2011, 9 pages.
Preliminary Rejection for Korean Patent Application No. 2010-70033995, mailed on Jul. 4, 2011, 7 pages.
PCT International Search Report of the International Searching Authority for Application No. PCT/US08/72013 Oct. 22, 2008.
PCT Written Opinion of the International Searching Authority for Application No. PCT/US08/72013 Oct. 22, 2008.

* cited by examiner

*Primary Examiner* — Sonny Trinh
(74) *Attorney, Agent, or Firm* — Kilpatrick Townsend & Stockton LLP; Ardeshir Tabibi

(57) ABSTRACT

A tuner includes, in part, one or mixers, one or more filters, one or more variable gain stages, one or more analog to digital converters, and a baseband processor. Each filter is responsive to an associated mixer's output signal. Each variable gain stage is responsive to an associated filter's output. Each analog-to-digital converter is adapted to convert the output signal of an associated variable gain stage to a digital signal. The baseband processor is responsive to the digital signal supplied by the analog-to-digital converter(s). The baseband processor is further configured to supply a signal to be demodulated by a processing unit external to the integrated circuit. The baseband processor performs no or a fraction of the required demodulation functions. The processing unit may be a central processing unit or a graphical processing unit.

16 Claims, 2 Drawing Sheets

TUNER FOR CABLE, SATELLITE AND BROADCAST APPLICATIONS

CROSS-REFERENCE TO RELATED APPLICATIONS

The present application claims benefit under 35 USC 119 (e) of U.S. provisional application No. 60/953,645, filed Aug. 2, 2007, entitled "Tuner And Software Architectures For Cable, Satellite And Broadcast Applications", the content of which is incorporated herein by reference in its entirety.

BACKGROUND OF THE INVENTION

In applications such as broadcast, cable and satellite television and radio, tuning and demodulation functions are typically performed by one or more integrated circuits. The tuner is often an analog/RF module or integrated circuit supplying an analog signal to the demodulator. The demodulator has a data converter and often has a dedicated digital circuit which processes the converted signal and generates a data transport stream. The data stream typically contains the compressed video stream in, for example, the MPEG2 format when the DVB-T standard is used.

FIG. 1 is a block diagram of an analog tuner 10 in communication with a demodulator 30, as known in the prior art. Tuner 10 is shown as including a low-noise amplifier (LNA) 12, a mixer 14 adapted to receive a clock signal generated by local oscillator (LO) 16, an intermediate frequency (IF) filter 18 and a variable gain block 20. Demodulator 30 is shown as including an analog-to-digital converter (ADC) 32, a digital baseband modulator/demodulator (MODEM) 34 and a digital interface 36. Digital interface 36 may be a USB2.0 or PCI Express that supplies a transport stream to host CPU 40. MODEL 34 performs modulation and demodulation operations.

FIG. 2 is a block diagram of an analog RF tuner and demodulator 50, also known in the prior art. The system shown in FIG. 2 is similar to that shown in FIG. 1 except that in the system shown in FIG. 2, analog tuner 10 and demodulator 30 are disposed in the same integrated circuit or module 50. For the systems shown in both FIGS. 1 and 2, host CPU 40 is adapted to receive the transport date stream from the digital interface and process typical software applications. In conventional systems, host CPU 40 is not adapted to perform any demodulation operations.

BRIEF SUMMARY OF THE INVENTION

A tuner, in accordance with one embodiment of the present invention, includes, in part, one or more mixers, one or more filters, one or more variable gain stages, one or more analog to digital converters, and a baseband processor. Each filter is responsive to an associated mixer's output signal. Each variable gain stage is responsive to an associated filter's output. Each analog-to-digital converter is adapted to convert the output signal of an associated variable gain stage to a digital signal. The baseband processor is responsive to the analog-to-digital converter(s) and supplies a processed signal to be fully or partially demodulated by a processing unit external to the tuner. In one embodiment, the baseband processor does not perform any demodulation function thus requiring the external processing unit to perform all of the required demodulation functions. In another embodiment, the baseband processor performs some of the demodulation functions with the remaining demodulation operations being performed by the external processing unit.

In one embodiment, the tuner further includes a digital interface responsive to the baseband processor's output. In one embodiment, the processing unit is a central processing unit. In another embodiment, the processing unit is a graphical processing unit. In one embodiment, the processing unit is formed by a network of computer systems each having a processor.

A method of processing a received RF signal, in accordance with one embodiment of the present invention includes, in part, generating an analog intermediate frequency signal or complex baseband signal from the RF signal, filtering the intermediate frequency analog or complex baseband signal, controlling a gain of the filtered analog signal, converting the filtered gain-controlled analog signal to a digital signal, and performing baseband signal processing operations on the digital signal. In one embodiment, the baseband signal processing operations do not include demodulation operations. In another embodiment, the baseband signal processing operations include a fraction of the required demodulation operations.

In one embodiment, the method further includes performing a multitude of demodulation operations on the baseband processed signals using a processor resident on a host. In one embodiment, the host resident processor is a central processing unit. In another embodiment, the host resident processor is a graphical processing unit.

DETAILED DESCRIPTION OF THE INVENTION

In accordance with one embodiment of the present invention, a tuner includes, in part, a mixer, a filter responsive to the mixer's output signal, a variable gain stage responsive to the filter's output signal, an analog-to-digital converter adapted to convert the output signal of the variable gain stage to a digital signal, and a baseband processor responsive to the digital signal supplied by the analog-to-digital converter. An external processing unit resident on a host computer performs the entire set or most of the demodulation operations. In one embodiment, the baseband processor does not perform any demodulation operations thus requiring the external processing unit to perform all of the demodulation functions. In another embodiment, the baseband processor performs some of the demodulation functions with the remaining demodulation operations being performed by the external processing unit The following description is provided with reference to a central processing unit (CPU). It is understood, however, that any other processing unit, such as a graphical processing unit (GPU) may also be used. A tuner, in accordance with the present invention is both cost-effective and is efficient to implement on a receiver.

As processors become increasingly more powerful, the number of instructions per second required to perform demodulation operations become more and more amenable to implementation in software running on the CPU of, for example, a PC (e.g. a laptop, desktop computer, cell phone, PDA, etc). As the speed and performance of the CPUs continue to increase, the amount of processing power required for demodulation of a signal has become a smaller fraction, for example, one tenth, of the overall processing power of today's CPUs. This trend is expected to continue, especially since the CPUs are being designed to include progressively more sophisticated multimedia processing instructions amenable to communications signal processing.

Figure 1:
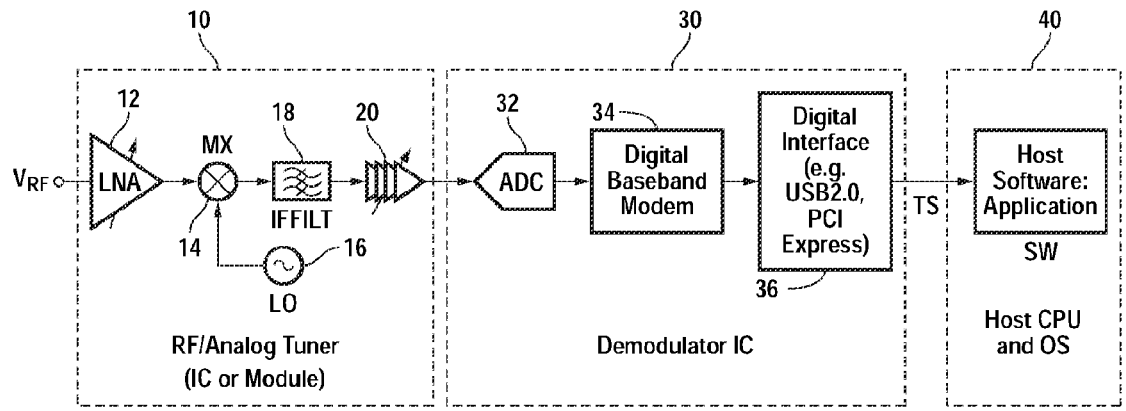
FIG. 1 is a block diagram of an analog tuner in communication with a demodulator, as known in the prior art.
Figure 2:
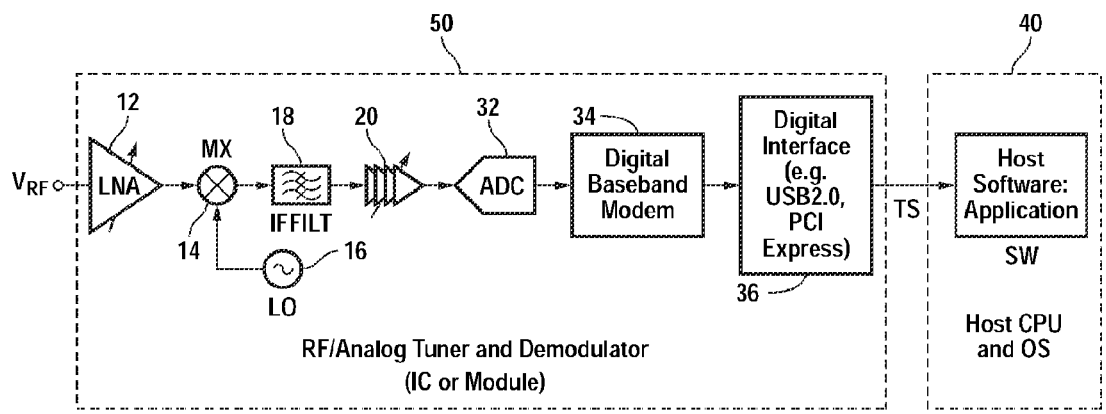
FIG. 2 is a block diagram of an analog tuner and demodulator, also known in the prior art.
Figure 3:
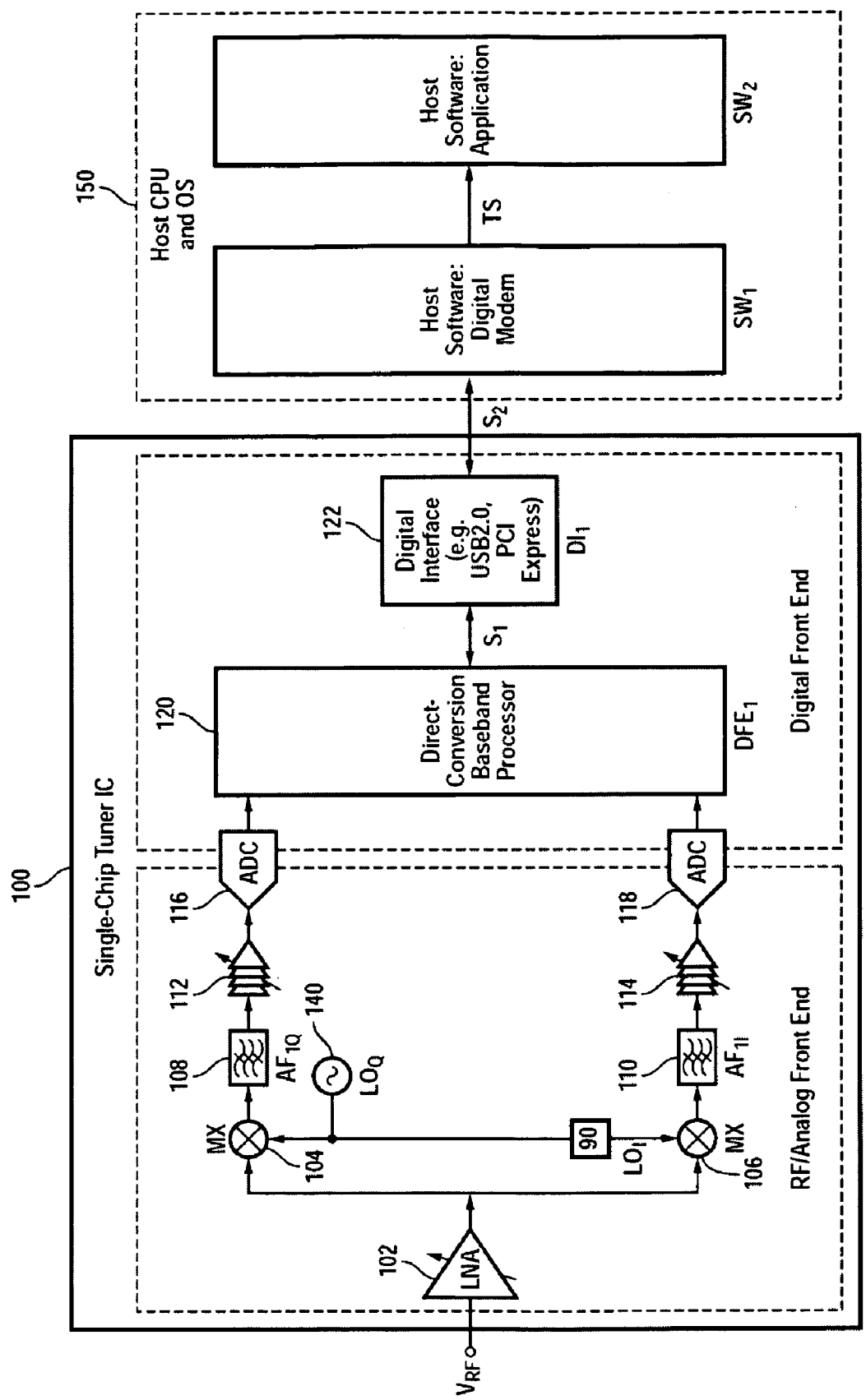
FIG. 3 is a block diagram of a tuner, in accordance with one embodiment of the present invention.

FIG. 3 is a block diagram of a tuner integrated circuit 100, in accordance with one embodiment of the present invention. Tuner 100 is shown as including, in part, a low-noise amplifier 102, a pair of mixers 104 and 106, a pair of intermediate frequency (IF) filters 108, 110, a pair of variable gain blocks 112, 114, a pair of ADCs 116, 118, a direct conversion baseband processor 120, and a digital interface 122. Digital interface 122 may be a USB 2.0, a PCI Express interface, etc.

Low noise amplifier 102 may include multiple stages. In some embodiments, low noise amplifier 102 may be a variable gain amplifier whose gain may be varied by one or more control lines (not shown). Such a variable gain amplifier may be part of a gain control loop, such as an automatic gain control loop (not shown).

The output signal of amplifier 102 is shown as being coupled to first and second mixers 104, 106. Any other type of frequency conversion module may be used in place of mixers 104, 106. An RF local oscillator (LO) 120 is configured to generate a local oscillator signal to mixers 104, 106. In response, mixers 104 and 106 frequency convert the received RF signal to a substantially baseband signal. A signal may be a substantially baseband signal if the frequency conversion process to downconvert a signal is non-ideal, for example, due to LO errors or differences at the transmitter or receiver, and errors or differences in the RF signal relative to a specified frequency of operation. For example, an RF signal may be different from a specified operating channel due to LO frequency shifts at the transmitter or Doppler shifts. Typically, the error or difference is a fraction of the baseband signal bandwidth.

The output signal of mixer 104, which may be an in-phase baseband signal, is delivered to in-phase filter 108. Likewise, the output signal of mixer 106, which may be a quadrature baseband signal, is delivered to quadrature phase filter 110. Each of filters 108 and 110 may be a programmable filter with a variable bandwidth. The bandwidths of filters 108 and 110 may be selected using one or more control signals (not shown) and in accordance with a communication standard or mode that tuner 100 is configured to support.

ADC 116 is adapted to convert the output signal of filter 112 to a corresponding digital signal. Likewise, ADC 118 is adapted to convert the output signal of filter 114 to a corresponding digital signal. The output signals of ADCs 116 and 118 are supplied to baseband processor 120. In one embodiment, baseband processor 120 is adapted to perform baseband processing operations such as filtering, scaling, equalization, calibration, etc. In another embodiment, direct conversion baseband processor 120 may also perform Fast Fourier Transform (FFT) operations or other elements of signal processing functions.

Output signal $S_1$ of baseband processor 120 is an intermediate frequency signal that may be a complex baseband I/Q signal, a complex FFT signal, etc. Digital interface 122 converts signal $S_1$ to signal $S_2$ and transfers signal $S_2$ to host 150 that is external to tuner 100. A software application running on host 150 performs the required demodulation operations on signal S2 to generate the transport stream TS. Transport stream TS may, in turn, be used by a second software application running on host 150 for further processing. Signals $S_1$ and $S_2$ are bidirectional signals which allow for control and processing information to be passed between tuner 110 and host 150. Because the demodulation operations are either not performed or only partially performed by baseband processor 120, baseband processor 120 is easier to design and has a smaller area, thus enabling tuner 100 to be more cost-effective. It is understood that host 150 may include a single processing core or a multitude of processing cores. Host 150 may be a centralized or a distributed network of CPUs. In some embodiments, one or more GPUs may be used in place of the CPUs.

Consequently, in accordance with the present invention, efficient direct conversion of the RF signal is integrated with digital baseband processing, in turn, resulting in the following advantages. The direct conversion of the radio signals is amenable to the inclusion of efficient data conversion (ADC) on the radio side, while enabling the implementation of the baseband processing in digital form. The present invention also permits the bandwidth of signal $S_2$ to be substantially lower compared with the raw signals emerging from ADCs 116 and 118, thus allowing lower-bandwidth, and low-cost interfaces such as USB2.0 to be used for data transfer to the CPU (GPU).

The present invention, by partitioning the required operations as shown in FIG. 3, dispenses the need for a separate hardware to perform baseband demodulation operations. In other words, the present invention uses the available memory and resident CPU, GPU, etc., of a centralized or distributed system to carry out these operations. This results in significant cost, power and area savings in the system design. The present invention may be used in cable, satellite, broadcast TV, satellite radios, broadcast radios, etc.

The above embodiments of the present invention are illustrative and not limiting. Various alternatives and equivalents are possible. The invention is not limited by the type of modulation, demodulation, equalization, filtering, etc., performed. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. An integrated circuit comprising:
    at least one mixer;
    at least one filter responsive to the at least one mixer's output signal;
    at least one variable gain stage responsive to the at least one filter's output;
    at least one an analog-to-digital converter adapted to convert to a digital signal an analog signal generated by the at least one variable gain stage; and
    a baseband processor responsive to the analog-to-digital converter, said baseband processor configured to supply a signal to be demodulated by a processing unit external to the integrated circuit.

2. The integrated circuit of claim 1 further comprising:
    a digital interface responsive to the baseband processor's output signal.

3. The integrated circuit of claim 2 wherein said processing unit is a central processing unit.

4. The integrated circuit of claim 2 wherein said processing unit is a graphical processing unit.

5. The integrated circuit of claim 1 wherein said processing unit performs an entire set of required demodulation operations.

6. A system comprising:
    at least one mixer;
    at least one filter responsive to the mixer's output signal;

at least one variable gain stage responsive to the at least one filter's output;

at least one an analog-to-digital converter adapted to convert to a digital signal an analog signal generated by the at least one variable gain stage;

at least one baseband processor responsive to the at least one analog-to-digital converter, said baseband processor configured to supply a signal to be demodulated;

a digital interface responsive to the baseband processor's output signal; and a processing unit resident on a host system and adapted to perform a first plurality of demodulation operations on a signal supplied by the digital interface.

7. The tuner of claim 6 wherein said processing unit is a central processing unit.

8. The tuner of claim 6 wherein said processing unit is a graphical processing unit.

9. The tuner of claim 6 wherein said processing unit is further adapted to perform a second plurality of demodulation operations.

10. The tuner of claim 6 wherein said first plurality of demodulation operations comprise an entire set of demodulation operations.

11. A method of processing a received RF signal, the method comprising:

generating an intermediate frequency analog signal from the RF signal;

filtering the analog signal;

controlling a gain of the filtered analog signal;

converting the filtered gain-controlled analog signal to a digital signal;

performing baseband signal processing operations on the digital signal, said baseband signal processing not to include demodulation operations; and performing a first plurality of demodulation operations on the baseband processed signal using a host processor.

12. The method of claim 11 further comprising:

performing a second plurality of demodulation operations on the baseband processed signals using the host processor.

13. The method of claim 11 wherein said processor is a central processing unit.

14. The method of claim 11 wherein said processor is a graphical processing unit.

15. The method of claim 11 further comprising:

supplying the baseband processed signal to the host processor via a USB interface.

16. The method of claim 11 further comprising:

supplying the baseband processed signal to the host processor via a PCI Express interface.

* * * * *